US011630452B2

(12) United States Patent
Yunoki

(10) Patent No.: US 11,630,452 B2
(45) Date of Patent: Apr. 18, 2023

(54) SCHEDULING SYSTEM AND METHOD FOR ONLINE PROGRAM UPDATE

(71) Applicant: Hitachi, Ltd., Tokyo (JP)

(72) Inventor: Shoji Yunoki, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 16/882,001

(22) Filed: May 22, 2020

(65) Prior Publication Data

US 2021/0365023 A1 Nov. 25, 2021

(51) Int. Cl.

| | |
|---|---|
| ***G05B 23/02*** | (2006.01) |
| ***G05B 19/418*** | (2006.01) |
| ***G06F 9/48*** | (2006.01) |
| ***G06F 8/65*** | (2018.01) |
| ***G05B 19/05*** | (2006.01) |

(52) U.S. Cl.

CPC ....... *G05B 23/0283* (2013.01); *G05B 19/056* (2013.01); *G05B 19/41865* (2013.01); *G06F 8/65* (2013.01); *G06F 9/4881* (2013.01)

(58) Field of Classification Search

CPC ............ G05B 19/056; G05B 19/41865; G05B 19/052; G05B 23/0283; G05B 2219/14018; G06F 9/4881; G06F 8/65; Y02P 90/02

See application file for complete search history.

(56) References Cited

U.S. PATENT DOCUMENTS

2005/0120106 A1* 6/2005 Albertao ................. H04L 67/34 709/223
2007/0150815 A1* 6/2007 Smith ..................... G06F 9/445 715/733
2015/0280471 A1* 10/2015 Farhi ..................... H02J 7/0044 320/137
2016/0357547 A1 12/2016 Menjo et al.

(Continued)

FOREIGN PATENT DOCUMENTS

JP 2008140369 A 6/2008
JP 2010277367 A 12/2010

(Continued)

OTHER PUBLICATIONS

Notice of Reasons for Refusal for related Application No. JP 2021-043426, dated Aug. 9, 2022, 7 pages.

(Continued)

*Primary Examiner* — Charles E Anya
(74) *Attorney, Agent, or Firm* — Procopio, Cory, Hargreaves & Savitch LLP

(57) ABSTRACT

Example implementations described herein involve systems and methods for managing a plurality of programmable logic controllers (PLC), which can involve, for a detection of an update to one or more of a software or a firmware installed on a PLC of the plurality of PLCs being available, determining an impact level of the update to the one or more of the software or the firmware installed on the PLC of the plurality of PLCs; selecting a non-operational time slot for the PLC of the plurality of PLCs based on the impact level, wherein higher impact levels are indicative of requiring a longer non-operational time slot; and scheduling the update to the one or more of the software or the firmware installed on the PLC of the plurality of PLCs during the non-operational time slot.

15 Claims, 14 Drawing Sheets

(56) References Cited

U.S. PATENT DOCUMENTS

| | | | | |
|---|---|---|---|---|
| 2018/0357058 | A1* | 12/2018 | Malaspina | G06F 8/71 |
| 2019/0324737 | A1 | 10/2019 | Patil | |
| 2019/0377315 | A1* | 12/2019 | Anand | G06F 16/2428 |
| 2020/0293301 | A1* | 9/2020 | Sato | G06F 8/65 |
| 2020/0293302 | A1* | 9/2020 | Sato | G06F 9/4843 |

FOREIGN PATENT DOCUMENTS

| | | | |
|---|---|---|---|
| JP | 2017138789 | A | 8/2017 |
| JP | 2020502650 | A | 1/2020 |
| WO | 2015083243 | A1 | 6/2015 |
| WO | 2015083243 | A1 | 11/2015 |

OTHER PUBLICATIONS

Japanese Patent Office. Notice of Reasons for Refusal dated Mar. 11, 2022. Japan Patent Application No. 2021-043426. Japanese Language. 4 pages.

Japanese Patent Office. Notice of Reasons for Refusal dated Mar. 11, 2022. Japan Patent Application No. 2021-043426. English Language Translation. 4 pages.

* cited by examiner

105

Device configuration table

| PLC# (120) | Vendor (121) | Model (122) | Firmware Ver. (123) | Assigned process/ Software version (124) |
|---|---|---|---|---|
| 1 | vendor 1 | V1A | V1A_5 | 5/5-5 |
| 2 | vendor 2 | V2A | V2A_3 | 6/6-2 |

Firmware version management table

| Vendor (130) | Model (131) | Latest Firmware Ver. (132) | Impact Level (133) |
|---|---|---|---|
| vendor 1 | V1A | V1A_6 | High |
| vendor 2 | V2A | V2A_3 | High |

Software version management table 140 141 142

| Process | Latest program ver. | Impact level |
|---|---|---|
| 5 | 5-5 | Low |
| 6 | 6-3 | Low |

Impact level table 150 151

| Impact level | Required Marginal Time |
|---|---|
| High | 48 hours |
| Middle | 6 hours |
| Low | 1 hour |

Non operation schedule table

| PLC# (160) | Non-operational (T_0) (161) | Non-operational (T_1) (162) | Non-operational (T_2) (163) |
|---|---|---|---|
| 1 | 2 hours (1/1 23:00- 1/2 01:00) | 50 hours (1/10 23:00- 1/13 01:00) | 2 hours (1/17 23:00- 1/18 01:00) |
| 2 | 2 hours (1/1 23:00- 1/2 01:00) | 50 hours (1/10 23:00- 1/13 01:00) | 2 hours (1/17 23:00- 1/18 01:00) |

FIG. 6

113 Update schedule table

| Order# (171) | Non-operational (T_0) (172) | PLC# (173) | Update type (174) | Version (175) |
|---|---|---|---|---|
| 0 | T_0_2: 2 hours (1/1 23:00- 1/2 01:00) | 2 | Software | 6-3 |
| 1 | T_1_1: 50 hours (1/10 23:00- 1/13 01:00) | 1 | Firmware | V1A_6 |

Device configuration table

| 120 | 121 | 122 | 123 | 124 | 1101 |
|---|---|---|---|---|---|
| PLC# | Vendor | Model | Firmware Ver. | Assigned process/ Software version | Connected end device |
| 1 | vendor 1 | V1A | V1A_5 | 5/5-5 | Robot arm |
| 2 | vendor 2 | V2A | V2A_3 | 6/6-2 | Ink jet printer |

Connected end device and impact level association table 1202 1203

| Connected end device | Impact level |
| --- | --- |
| Robot arm | High |
| Belt conveyer | Middle |
| Ink jet printer | Low |

FIG. 12

SCHEDULING SYSTEM AND METHOD FOR ONLINE PROGRAM UPDATE

BACKGROUND

Field

The present disclosure is related to management systems for manufacturing, and more specifically, to scheduling systems and methods for online program updates.

Related Art

In recent years, devices in manufacturing factories have been connected the Internet according to the developments made for smart factories, Industry 4.0 and so on. It has thereby become necessary to take measures against vulnerability to protect the devices from malicious attacks such as firmware update, software update and so on. Related art methods involve a firmware update scheduling method, wherein a firmware update management server implements the firmware update schedule according to the Internet of Things (IoT) devices activity information and executes the firmware update to IoT devices over-the-air. Availability (e.g., how much the IoT system operates correctly when it needs to operate) is one of the most important indicators for IoT systems. If the firmware update causes the IoT system to undergo serious problems such as disabling the booting of the IoT device, the availability of the IoT system decreases.

SUMMARY

Aspects of the present disclosure involve a method for managing a plurality of programmable logic controllers (PLC), the method involving, for a detection of an update to one or more of a software or a firmware installed on a PLC of the plurality of PLCs being available, determining an impact level of the update to the one or more of the software or the firmware installed on the PLC; selecting a non-operational time slot for the PLC of the plurality of PLCs based on the impact level, wherein higher impact levels are indicative of requiring a longer non-operational time slot; and scheduling the update to the one or more of the software or the firmware installed on the PLC of the plurality of PLCs during the non-operational time slot.

Aspects of the present disclosure involve a computer program for managing a plurality of programmable logic controllers (PLC), the computer program having instructions involving, for a detection of an update to one or more of a software or a firmware installed on a PLC of the plurality of PLCs being available, determining an impact level of the update to the one or more of the software or the firmware installed on the PLC; selecting a non-operational time slot for the PLC of the plurality of PLCs based on the impact level, wherein higher impact levels are indicative of requiring a longer non-operational time slot; and scheduling the update to the one or more of the software or the firmware installed on the PLC of the plurality of PLCs during the non-operational time slot. The instructions may be stored in a non-transitory computer readable medium for execution by one or more processors.

Aspects of the present disclosure involve a system for managing a plurality of programmable logic controllers (PLC), the system involving, for a detection of an update to one or more of a software or a firmware installed on a PLC of the plurality of PLCs being available, means for determining an impact level of the update to the one or more of the software or the firmware installed on the PLC; means for selecting a non-operational time slot for the PLC of the plurality of PLCs based on the impact level, wherein higher impact levels are indicative of requiring a longer non-operational time slot; and means for scheduling the update to the one or more of the software or the firmware installed on the PLC of the plurality of PLCs during the non-operational time slot.

Aspects of the present disclosure involves an apparatus for managing a plurality of programmable logic controllers (PLC), the apparatus involving a processor, configured to, for a detection of an update to one or more of a software or a firmware installed on a PLC of the plurality of PLCs being available, determine an impact level of the update to the one or more of the software or the firmware installed on the PLC of the plurality of PLCs; select a non-operational time slot for the PLC of the plurality of PLCs based on the impact level, wherein higher impact levels are indicative of requiring a longer non-operational time slot; and schedule the update to the one or more of the software or the firmware installed on the PLC of the plurality of PLCs during the non-operational time slot.

BRIEF DESCRIPTION OF DRAWINGS

FIG. 2 illustrates an example device configuration table, in accordance with an example implementation.

FIG. 3 illustrates an example firmware version management table, in accordance with an example implementation.

FIG. 4 illustrates an example software version management table, in accordance with an example implementation.

FIG. 5 illustrates an example impact level table, in accordance with an example implementation.

FIG. 6 illustrates an example non-operational schedule table, in accordance with an example implementation.

FIG. 7 illustrates an example of the update schedule table, in accordance with an example implementation.

FIG. 11 illustrates another example of the device configuration table.

FIG. 12 illustrates an example of the impact level association table.

DETAILED DESCRIPTION

Figure 1:
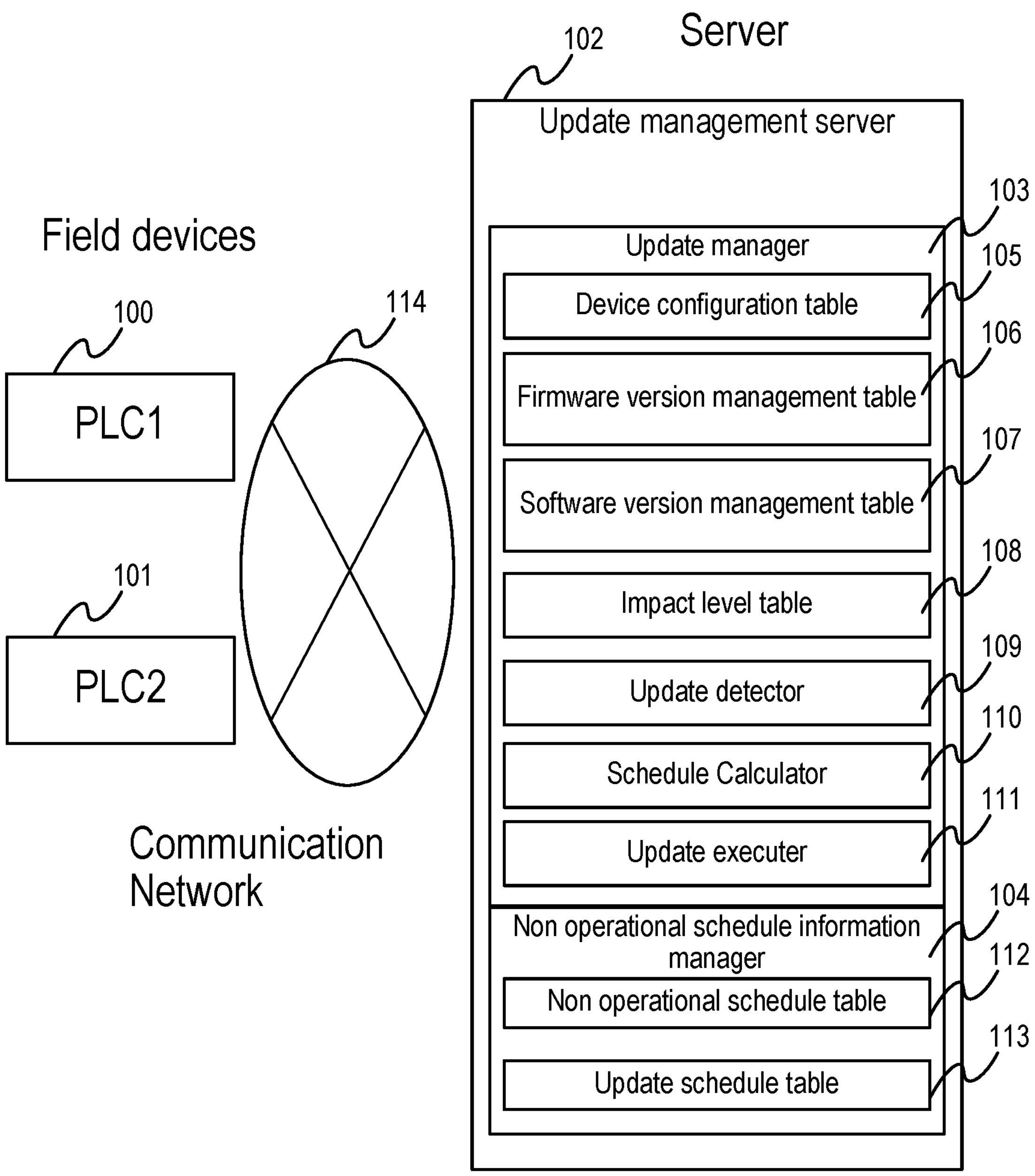
FIG. 1 illustrates the update management system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve facilitating a firmware/software update scheduling system while taking into account how much impact the firmware/software update gives to the targeted IoT device when it fails. The proposed firmware/software update scheduling system calculates firmware/software update schedule based on how much of an impact a firmware/software update gives to the targeted IoT device, and the expected operational/non-operational schedule of the IoT device.

In example implementations, the calculated schedules are as follows. If a firmware/software update has big impact on the targeted IoT device (e.g., beyond a threshold), the update is done when the device has a prolonged non-operational time. If the firmware/software update has a small impact on the targeted IoT device, the update is done even when there is only a short non-operational time available.

Described herein is a first example implementation of an update management system/method.

FIG. 1 illustrates the update management system, in accordance with an example implementation. The update management server 102 connects to field devices such as PLC1 100 and PLC2 101 via communication network 114. The update management server 102 manages the update to field devices. The update management server 102 can involve update manager 103 and non-operational schedule information manager 104.

Update manager 103 can involve device configuration table 105, firmware version management table 106, software version management table 107, impact level table 108, update detector 109, schedule calculator 110 and update executer 111. Non-operational schedule information manager 104 can involve non-operational schedule table 112 and update schedule table 113. Further details of each of these tables are described below.

FIG. 2 illustrates an example device configuration table 105, in accordance with an example implementation. The device configuration table 105 indicates the current configuration of the managed PLCs in the factory, and which firmware/software versions are currently applied to the PLCs. Device configuration table 105 can include entries for PLC #120, Vendor 121, Model 122, Firmware Version 123 and assigned process/software version 124. PLC # indicates the identifier (ID) of the programmable logic controller (PLC). Vendor 121 indicates the vendor of the PLC. Model 122 indicates the model of the PLC. Firmware Version 123 indicates the version of the firmware installed on the PLC. Assigned process/software version 124 indicates the manufacturing/other process presently assigned to the PLC and the software version for handling the assigned process as installed on the PLC.

FIG. 3 illustrates an example firmware version management table 106, in accordance with an example implementation. Specifically, FIG. 3 illustrates an example management table for managing firmware associated with the PLCs on the manufacturing floor. The latest firmware version available is provided by the vendor of the PLC. The information of FIG. 3 is used in comparison with the information of FIG. 2 to determine updates. Firmware version management table 106 can include Vendor 130, Model 131, Latest Firmware Version 132, and Impact Level 133. Vendor 130 indicates the underlying vendor for the firmware. Model 131 indicates the underlying model for the vendor. Latest firmware version 132 indicates the latest firmware version 132 for the vendor/model combination. Impact Level 133 indicates the impact to the PLC for updating the firmware to the latest firmware version 132. In an example illustrated in the first row, the latest version is V1A_6 and the impact level indicates high, which means that the update to the latest firmware will cause a high impact.

FIG. 4 illustrates an example software version management table 107, in accordance with an example implementation. Specifically, FIG. 4 illustrates indicates an example of the latest program version for each manufacturing/other process. Software version management table 107 can include process 140, latest program version 141, and impact level 142. Process 140 indicates the process applied for the software. Latest program version 141 indicates the latest program version for the underlying process. Impact level 142 indicates the impact to the PLC for updating the software to the latest program version.

In example implementations, the impact level can be determined such that if the target update is firmware, then the impact level is assumed to be higher than software updates. Impact level can also be determined based on historical data and length of time taken for previous updates. Other factors can be taken into consideration, such as the number of PLCs of the same vendor being used on the manufacturing floor, and adjusted accordingly by an operator. For example, the factory floor can involve many PLCs of the same model which are the same model and vendor; so for example, if there are ten PLCs having the same model V1A, the number of PLCs is large which should have a high impact to the factory floor. Operators can thereby guess the firmware impact level and input the impact level based on from success rate of previous installs, or how long it can take.

FIG. 5 illustrates an example impact level table 108, in accordance with an example implementation. Specifically, FIG. 5 illustrates an example of an impact level table defining the relationship between impact level and required marginal time, wherein the required marginal time is related to the timing when each update can be applied to a PLC. The required marginal time should be enough to involve an estimate regarding the time taken for installing the one or more of the software or the firmware installed on the PLC of the plurality of PLCs as well as an estimated downtime of the PLC to facilitate the install. If the impact level is high, the update requires 48 hours as required marginal time.

Impact level table 108 can include impact level 150 and required marginal time 151. Impact level 150 indicates the various impact levels that can be set for the software version management table 107 and the firmware version management table 106. Required marginal time 151 indicates expected downtime incurred based on the role of the program being updated and its corresponding influence to the production process. For example, if the role of the program is a firmware based role, firmware updates tend to be more fundamental than software updates and can cause deeper effects on associated factory machines and their processes, thereby requiring a longer marginal time. The required marginal time 151 can be determined based on the past experience of operator, expected factory visits for downtime, expected calibration time, other physical maintenance time, expected downtime of production processes in response to the update, and so on, in accordance with an example implementation.

Thus as illustrated in FIGS. 5 and 6, the impact level is indicative of an estimate regarding expected downtime incurred for a device/PLC based on the role of the program being updated.

Figure 13:
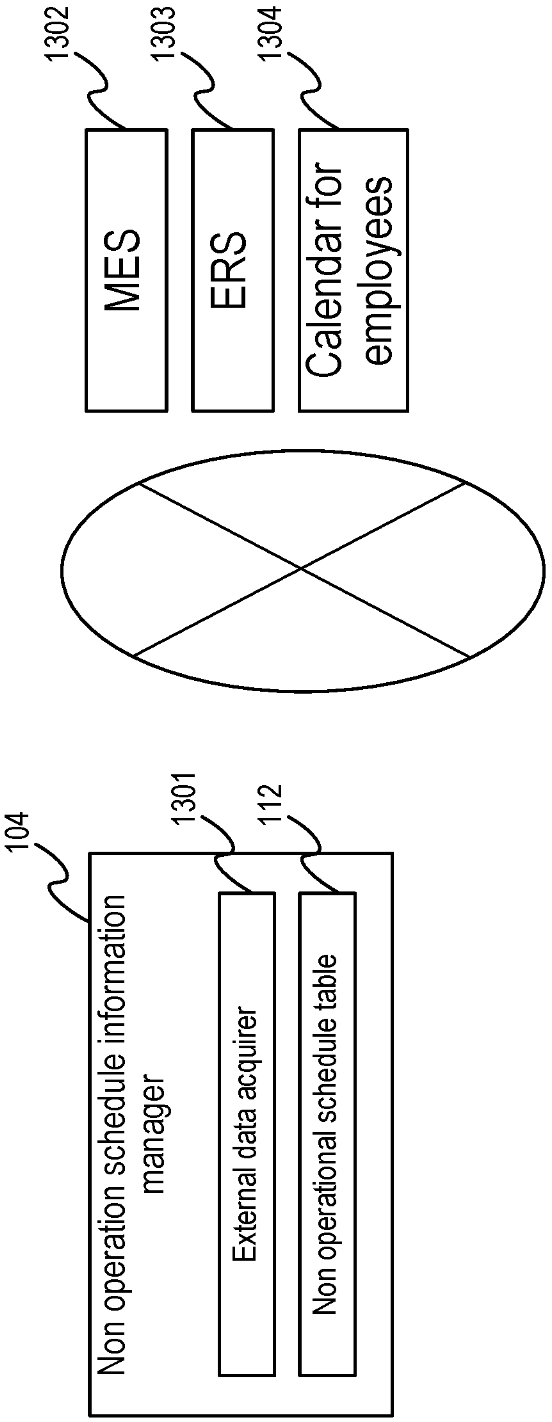
FIG. 13 illustrates an example of an external data acquirer, in accordance with an example implementation.

FIG. 6 illustrates an example non-operational schedule table 112, in accordance with an example implementation. Non-operational schedule table 112 includes PLC #160, Non-operational time T_0 161, Non-operational time T_1 162, and Non-operational time T_2 163. PLC #160 indicates the ID of the underlying PLC. Non-operational time T_0 161 indicates the earliest scheduled down time and duration for the underlying PLC. Non-operational time T_1 162 indicates the subsequent schedule downtime and duration for the underlying PLC after Non-operational time T_0 161. Non-operational time T_2 163 indicates the subsequent schedule downtime and duration for the underlying PLC after Non-operational time T_1 162. Such information can be provided by the operator of the factory floor, or in an example implementation as illustrated in FIG. 13, can be retrieved from an external system such as a manufacturing execution system, enterprise resource planner, employee calendars, or otherwise.

FIG. 7 illustrates an example of the update schedule table 113, in accordance with an example implementation. Update schedule table 113 can include Order #171, Non-operational time T_0 172, PLC #173, Update Type 174, and Version 175. Order #171 indicates the order in which the queued updates are executed. Non-Operational Time T_0 172 indicates the next period of non-operation during which the order is implemented. PLC #173 indicates the ID of the PLC that is subject to the order. Update type 174 indicates the type of update that is to be implemented. Version 175 indicates the version that is to be used for the update.

Figure 8:
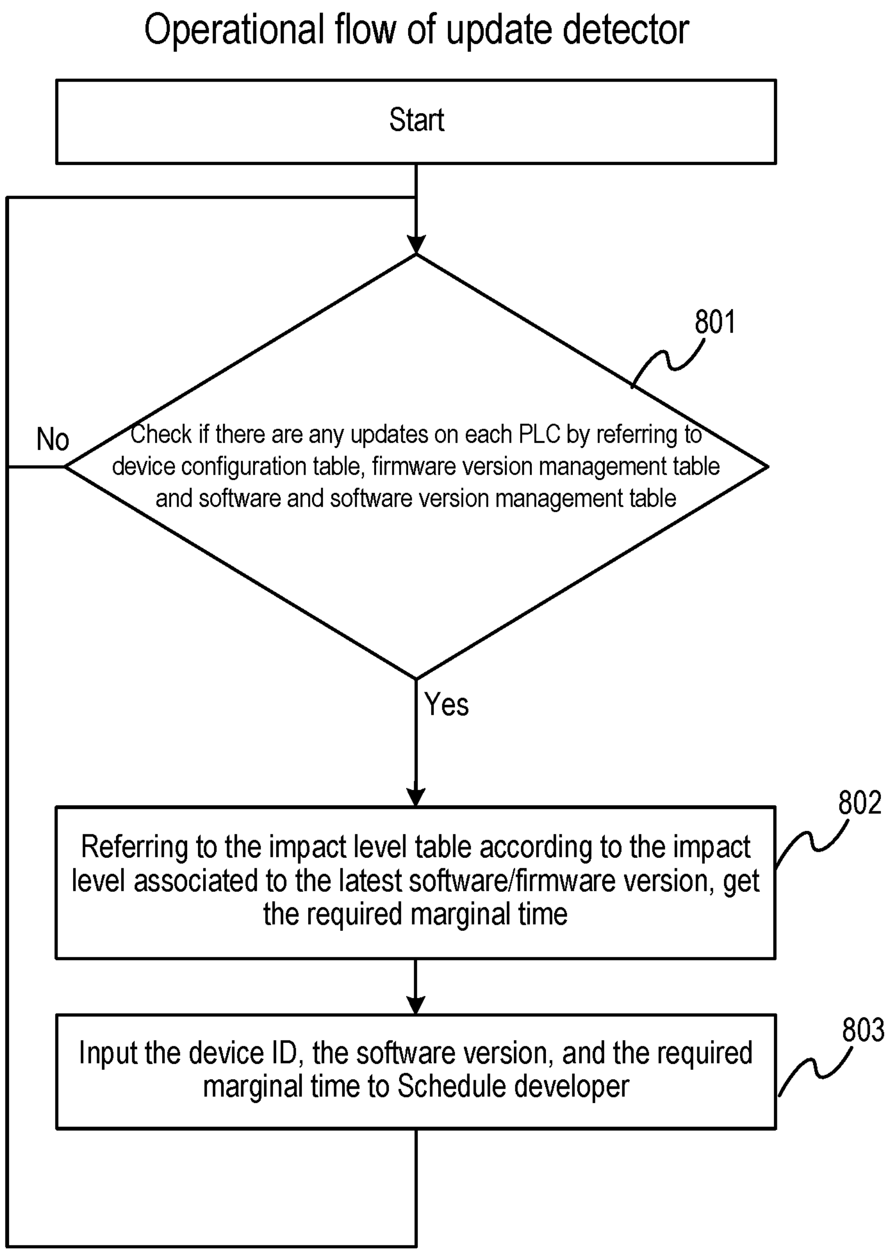
FIG. 8 illustrates an operational flow of the update detector, in accordance with an example implementation.

FIG. 8 illustrates an operational flow of the update detector 109, in accordance with an example implementation. In 801, the update detector checks if there are any updates on each PLC referring to device configuration table 105, firmware version management table 106 and software version management table 107. If the output from 801 is NO, the process proceeds to 801 again. If the output from 801 is YES, then the process proceeds to 802. In 802, the update detector refers to the impact level table 108 according to the impact level (142, 150) associated to the latest software/firmware version and obtains the required marginal time for the latest software/firmware version update and proceeds to 803. In 803, the update detector inputs the device ID, the firmware/software version, and the required marginal time to the Schedule calculator 110 and proceeds back to 801.

Figure 9:
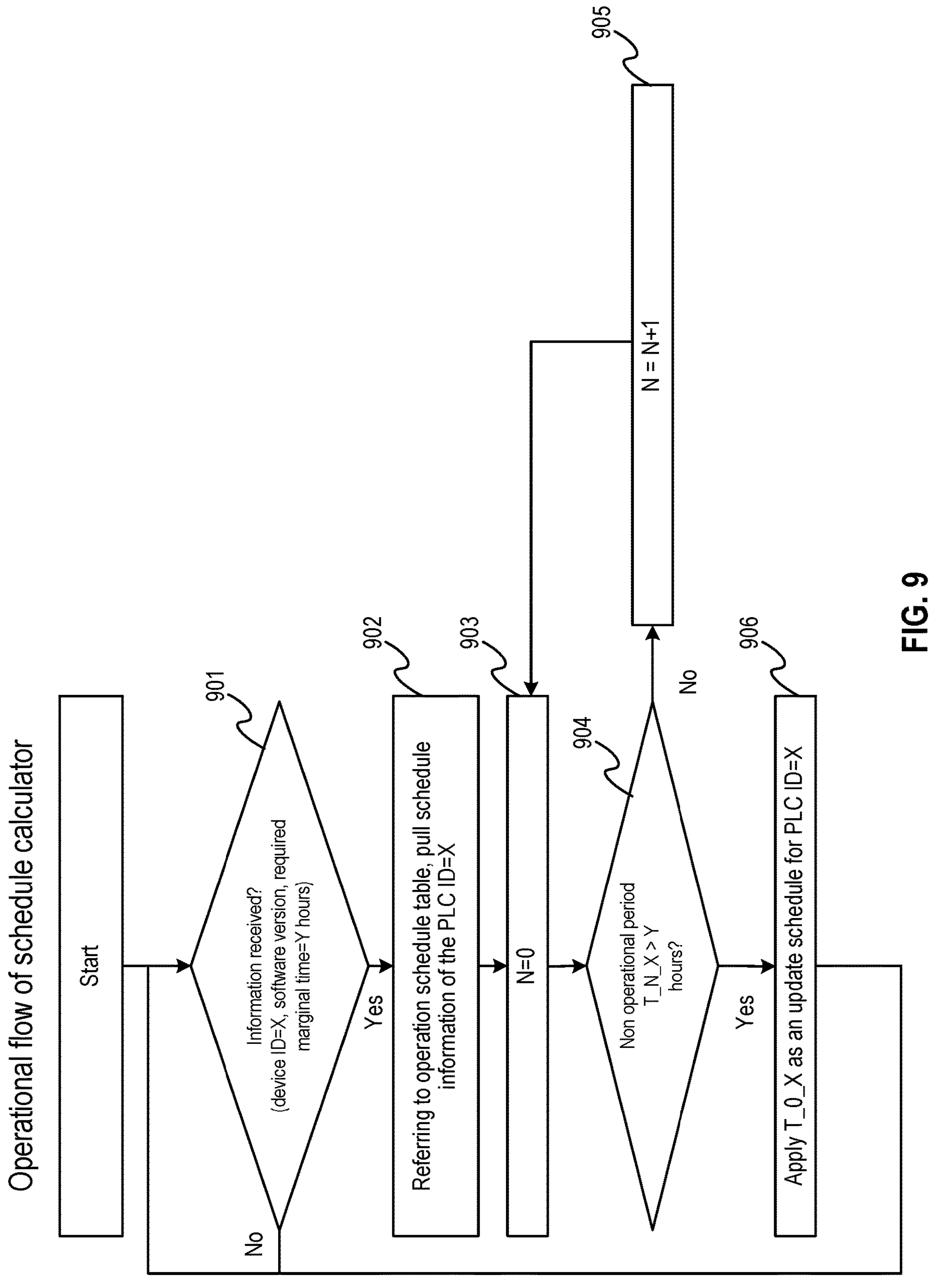
FIG. 9 illustrates the operational flow of the schedule calculator, in accordance with an example implementation.

FIG. 9 illustrates the operational flow of the schedule calculator 110, in accordance with an example implementation. In 901, the scheduler calculator 110 checks if it received the information (device ID=X, software version and required marginal time=Y[hours]) or not. If the result of 901 is NO, then the flow repeats at 901 again. If the result of 901 is YES, then the process proceeds to 902.

In 902, the scheduler calculator 110 refers to non-operation schedule table 112 and pulls the schedule information for PLC ID=X, and proceeds to 903. At 903, the schedule calculator 110 resets the variable N to 0 and proceeds to 904. At 904, the schedule calculator 110 checks if the non-operational period T_N_X is longer than the required marginal time Y. If the result of 904 is NO, the schedule calculator 110 moves to 905 to increment N by 1. If the result of 804 is YES, the schedule calculator 110 proceeds to 806 to apply T_N_X as an update schedule for PLC ID=X.

Figure 10:
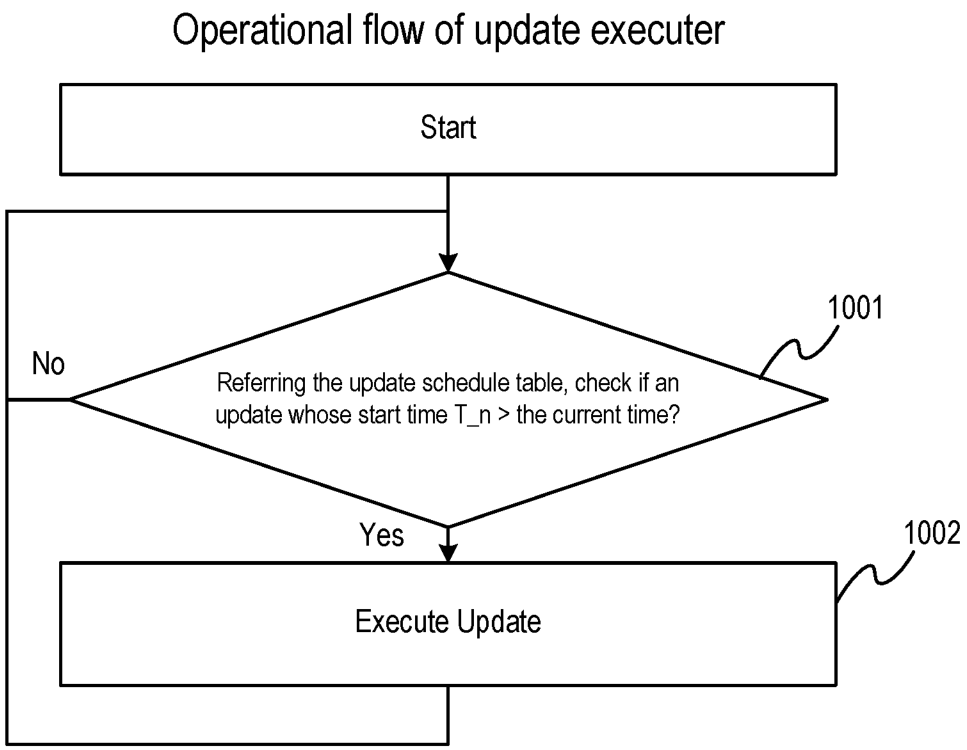
FIG. 10 illustrates the operational flow of update executer, in accordance with an example implementation.

FIG. 10 illustrates the operational flow of update executer 111, in accordance with an example implementation. In 1001, the update executer 111 refers the update schedule table 111 and checks if there any updates whose start time T_n>the current time. If the result of 1001 is NO, the update executer 111 loops back to 1001 again. If the result of 1001 is YES, the update executer 111 proceeds to 1002 and executes the update.

An example iteration is as follows. Assume that the current time is 00:00 on January 1$^{st}$.

At 801, the update detector detects the updates by referring to the configuration table 105, firmware version management table 106 and software management table 107. There are two update as follows. There is a firmware update to PLC1 (from the version V1A_5 to the version V1A_6), as the current firmware version for PLC1 is V1A_5, though the latest firmware version for PLC1 is V1A_6. There is also a software update to PLC2 (from the version 6-2 to the version 6-3), as the current software version of PLC2 is 6-2, though the latest firmware version for process 6 is 6-3.

At 802, the update detector gets the required marginal time for each update, referring to the impact level table 108 according to the impact level associated to the latest software/firmware version stored in firmware version management table 106 and software version management table 107. The marginal time for the firmware update to PLC1 is 48 hours, as the impact level for firmware V1A_6 is "high" in firmware version management table 106, and the required marginal time for impact level "high" is 48 hours in the impact level table 108. The marginal time for the software update to PLC2 is one hour, as the impact level for software 6-3 is "low" in the software version management table 107, and the required marginal time for impact level "low" is one hour in the impact level table 108.

In 803, the update detector inputs the device ID, the firmware/software version, the required marginal time to the schedule calculator 110. In this case, for Device ID:PLC1, Firmware ver.=V1A_5, the required marginal time=48 hours, and for Device ID:PLC2, Software ver.=6-2, the required marginal time=1 hour.

At 901, the schedule calculator 110 receives device ID, firmware/software version as follows. For Device ID:PLC1, Firmware ver.=V1A_5, the required marginal time=48 hours. For Device ID:PLC2, Software ver.=6-2, the required marginal time=1 hour.

At 902-906, the update schedule for PLC1 and PLC is calculated and registered in update schedule table 113 as follows. The update schedule for PLC1 is T_1_1 (1/10 23:00-1/13 01:00), as T_1_1=50 hours>the marginal time=48 hours. The update schedule for PLC2 is T_0_2 (1/1 23:00-1/2 01:00), as T_0_2=2 hours>the marginal time=1 hour.

At 1001 and 1002, the update executer executes the software/firmware update referring to the update schedule table 113 and the current time as follows. The software update (6-3) to PLC1 is executed at 23:00 on January 1st. The firmware update (V1A_6) to PLC2 is executed at 23:00 on January 10$^{th}$.

In a second example implementation, the impact level of software/firmware update is decided according to which end device is connected to a PLC.

FIG. 11 illustrates another example of the device configuration table. In such an example implementation, the device configuration table 105 in update management server 103 includes the column of the connected end device 1101.

FIG. 12 illustrates an example of the impact level association table. In the second example implementation, the update management server 103 includes a connected end device and impact level association table 1201 which can include a connected end device 1202 and impact level 1203. When a software/firmware update schedule to a PLC is calculated, the impact level is decided according to which end device is connected to the PLC. In example implementations, if there are multiple devices connected to the PLC, then the highest impact level can be selected.

In a third example implementation, there can be an external data acquirer that accesses external systems to fill in information as needed.

FIG. 13 illustrates an example of an external data acquirer, in accordance with an example implementation. In this example implementation, the non-operation schedule information manager 104 of the update management server 103 includes an external data acquirer 1301 which accesses external system such as Manufacturing Execution System (MES) 1302, enterprise resource planner (ERP) 1303, employee calendars from employee devices 1304, and so on to acquire and derive the non-operational schedule information in accordance with the desired implementation.

Through the example implementations described herein, it is thereby possible to determine and schedule updates for a PLC in accordance with an impact level.

Figure 14:
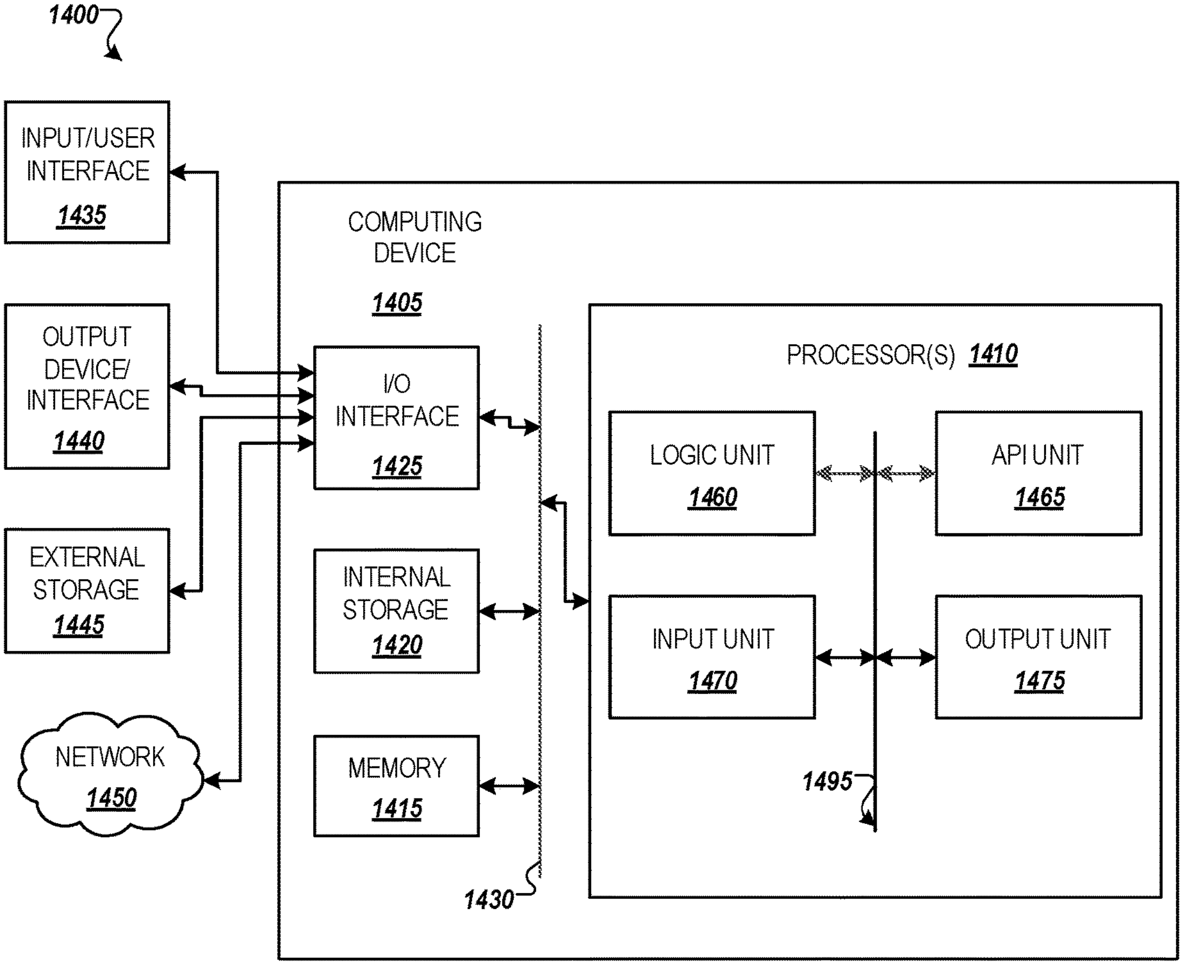
FIG. 14 illustrates an example computing environment with an example computer device suitable for use in some example implementations.

FIG. 14 illustrates an example computing environment with an example computer device suitable for use in some example implementations, such as an update management server for managing a plurality of programmable logic controllers (PLC) as illustrated in FIG. 1. Computer device 1405 in computing environment 1400 can include one or more processing units, cores, or processors 1410, memory 1415 (e.g., RAM, ROM, and/or the like), internal storage 1420 (e.g., magnetic, optical, solid state storage, and/or organic), and/or IO interface 1425, any of which can be coupled on a communication mechanism or bus 1430 for communicating information or embedded in the computer device 1405. IO interface 1425 is also configured to receive images from cameras or provide images to projectors or displays, depending on the desired implementation.

Computer device 1405 can be communicatively coupled to input/user interface 1435 and output device/interface 1440. Either one or both of input/user interface 1435 and output device/interface 1440 can be a wired or wireless interface and can be detachable. Input/user interface 1435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1440 may include a display, television, monitor, printer, speaker, braille, or the like. In some example implementations, input/user interface 1435 and output device/interface 1440 can be embedded with or physically coupled to the computer device 1405. In other example implementations, other computer devices may function as or provide the functions of input/user interface 1435 and output device/interface 1440 for a computer device 1405.

Examples of computer device 1405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1405 can be communicatively coupled (e.g., via IO interface 1425) to external storage 1445 and network 1450 for communicating with any number of networked components, devices, and systems, including one or more computer devices of the same or different configuration. Computer device 1405 or any connected computer device can be functioning as, providing services of, or referred to as a server, client, thin server, general machine, special-purpose machine, or another label.

TO interface 1425 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1400. Network 1450 can be any network or combination of networks (e.g., the Internet, local area network, wide area network, a telephonic network, a cellular network, satellite network, and the like).

Computer device 1405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1410 can execute under any operating system (OS) (not shown), in a native or virtual environment. One or more applications can be deployed that include logic unit 1460, application programming interface (API) unit 1465, input unit 1470, output unit 1475, and inter-unit communication mechanism 1495 for the different units to communicate with each other, with the OS, and with other applications (not shown). The described units and elements can be varied in design, function, configuration, or implementation and are not limited to the descriptions provided. Processor(s) 1410 can be in the form of hardware processors such as central processing units (CPUs) or in a combination of hardware and software units.

In some example implementations, when information or an execution instruction is received by API unit 1465, it may be communicated to one or more other units (e.g., logic unit 1460, input unit 1470, output unit 1475). In some instances, logic unit 1460 may be configured to control the information flow among the units and direct the services provided by API unit 1465, input unit 1470, output unit 1475, in some example implementations described above. For example, the flow of one or more processes or implementations may be controlled by logic unit 1460 alone or in conjunction with API unit 1465. The input unit 1470 may be configured to obtain input for the calculations described in the example implementations, and the output unit 1475 may be configured to provide output based on the calculations described in example implementations.

In example implementations, memory 1415 can manage and store information in the tables as illustrated at in FIGS.

2-7 and 11-12, as well as the functions for the flow diagrams of FIGS. 8-10 for loading into the processor(s) 1410 for execution.

Processor(s) 1410 can be configured to, for a detection of an update to one or more of a software or a firmware installed on a PLC of the plurality of PLCs being available, determine an impact level of the update to the one or more of the software or the firmware installed on the PLC of the plurality of PLCs; select a non-operational time slot for the PLC of the plurality of PLCs based on the impact level, wherein higher impact levels are indicative of requiring a longer non-operational time slot; and schedule the update to the one or more of the software or the firmware installed on the PLC of the plurality of PLCs during the non-operational time slot as illustrated in FIG. 8-10.

Processor(s) 1410 can be configured to determine the impact level of the update is based on a device connected to the PLC of the plurality of the PLCs as illustrated in FIGS. 11 and 12.

Processor(s) 1410 can be configured to determine the impact level the impact levels for firmware updates are set at higher levels than impact levels of software updates as illustrated at FIGS. 3 and 4.

In an example implementation, the non-operational time slot is determined from a Manufacturing Execution System (MES) as illustrated in FIG. 13.

Depending on the desired implementations, the impact level can be determined based on the expected downtime.

Processor(s) 1410 can be configured to execute the update to the one or more of the software or the firmware installed on the PLC of the plurality of PLCs during the non-operational time slot as illustrated at FIG. 10.

Depending on the desired implementation, the update to the software can be based on a manufacturing process installed on the PLC of the PLCs as illustrated at FIGS. 2 and 4.

Depending on the desired implementations, the impact level can be determined from a plurality of impact levels, each of the plurality of impact levels associated with an estimated required non-operational time as illustrated in FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing a plurality of programmable logic controllers (PLC), the method comprising:

for a detection of an update to one or more of a software or a firmware installed on a PLC of the plurality of PLCs being available:

determining an impact level of the update to the one or more of the software or the firmware installed on the PLC of the plurality of PLCs;

selecting a non-operational time slot for the PLC of the plurality of PLCs based on the impact level, wherein higher impact levels are indicative of requiring a longer non-operational time slot; and scheduling the update to the one or more of the software or the firmware installed on the PLC of the plurality of PLCs during the non-operational time slot, wherein impact levels for firmware updates are set at higher levels than impact levels of software updates, and wherein impact levels for firmware updates and software updates are estimated based on historical data, length of time associated with historical updates, and number of PCLs in use.

2. The method of claim 1, wherein the determining the impact level of the update is based on a device connected to the PLC of the plurality of the PLCs.

3. The method of claim 1, wherein the non-operational time slot is determined from a Manufacturing Execution System (MES).

4. The method of claim 1, wherein the impact level of the update is based on an expected downtime incurred based on a role of a program subject to the update.

5. The method of claim 1, further comprising executing the update to the one or more of the software or the firmware installed on the PLC of the plurality of PLCs during the non-operational time slot.

6. The method of claim 1, wherein the update to the software is based on a manufacturing process installed on the PLC of the PLCs.

7. The method of claim 1, wherein the impact level is determined from a plurality of impact levels, each of the plurality of impact levels associated with a predetermined required non-operational time.

8. A non-transitory computer readable medium, storing instructions for managing a plurality of programmable logic controllers (PLC), the instructions comprising:

for a detection of an update to one or more of a software or a firmware installed on a PLC of the plurality of PLCs being available:

determining an impact level of the update to the one or more of the software or the firmware installed on the PLC of the plurality of PLCs;

selecting a non-operational time slot for the PLC of the plurality of PLCs based on the impact level, wherein higher impact levels are indicative of requiring a longer non-operational time slot; and scheduling the update to the one or more of the software or the firmware installed on the PLC of the plurality of PLCs during the non-operational time slot, wherein impact levels for firmware updates are set at higher levels than impact levels of software updates, and wherein impact levels for firmware updates and software updates are estimated based on historical data, length of time associated with historical updates, and number of PCLs in use.

9. The non-transitory computer readable medium of claim 8, wherein the determining the impact level of the update is based on a device connected to the PLC of the plurality of the PLCs.

10. The non-transitory computer readable medium of claim 8, wherein the non-operational time slot is determined from a Manufacturing Execution System (MES).

11. The non-transitory computer readable medium of claim 8, wherein the impact level of the update is based on an expected downtime incurred based on a role of a program subject to the update.

12. The non-transitory computer readable medium of claim 8, the instructions further comprising executing the update to the one or more of the software or the firmware installed on the PLC of the plurality of PLCs during the non-operational time slot.

13. The non-transitory computer readable medium of claim 8, wherein the update to the software is based on a manufacturing process installed on the PLC of the PLCs.

14. The non-transitory computer readable medium of claim 8, wherein the impact level is determined from a plurality of impact levels, each of the plurality of impact levels associated with an estimated required non-operational time.

15. An apparatus for managing a plurality of programmable logic controllers (PLC), the apparatus comprising:

a processor, configured to, for a detection of an update to one or more of a software or a firmware installed on a PLC of the plurality of PLCs being available:

determine an impact level of the update to the one or more of the software or the firmware installed on the PLC of the plurality of PLCs;

select a non-operational time slot for the PLC of the plurality of PLCs based on the impact level, wherein higher impact levels are indicative of requiring a longer non-operational time slot; and schedule the update to the one or more of the software or the firmware installed on the PLC of the plurality of PLCs during the non-operational time slot, wherein impact levels for firmware updates are set at higher levels than impact levels of software updates, and wherein impact levels for firmware updates and software updates are estimated based on historical data, length of time associated with historical updates, and number of PCLs in use.

* * * * *